(12) United States Patent
Koda

(10) Patent No.: US 11,765,260 B2
(45) Date of Patent: Sep. 19, 2023

(54) COMMUNICATION TERMINAL, INFORMATION PROCESSING DEVICE, INFORMATION PROCESSING SYSTEM, INFORMATION PROCESSING METHOD, AND PROGRAM

(71) Applicant: NEC Corporation, Tokyo (JP)

(72) Inventor: Yoshinori Koda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/616,734

(22) PCT Filed: May 13, 2020

(86) PCT No.: PCT/JP2020/019080
§ 371 (c)(1),
(2) Date: Dec. 6, 2021

(87) PCT Pub. No.: WO2020/250614
PCT Pub. Date: Dec. 17, 2020

(65) Prior Publication Data
US 2022/0329681 A1 Oct. 13, 2022

(30) Foreign Application Priority Data
Jun. 10, 2019 (JP) ................... 2019-107903

(51) Int. Cl.
*H04M 1/67* (2006.01)
*H04M 3/42* (2006.01)

(52) U.S. Cl.
CPC .......... *H04M 1/67* (2013.01); *H04M 3/42059* (2013.01); *H04M 2203/6045* (2013.01); *H04M 2250/74* (2013.01)

(58) Field of Classification Search
CPC .............. H04M 1/67; H04M 3/42059; H04M 2203/6045; H04M 2250/74;
(Continued)

(56) References Cited

U.S. PATENT DOCUMENTS 8,630,860 B1 * 1/2014 Zhang ................. G06F 16/9535
707/723
2006/0140386 A1 * 6/2006 Morganstein ........... G10L 17/00
379/224

(Continued)

FOREIGN PATENT DOCUMENTS

CA 2845843 A1 * 9/2014 ............. G06F 21/31
CN 207895501 U * 9/2018
(Continued)

OTHER PUBLICATIONS

International Search Report for PCT Application No. PCT/JP2020/019080, dated Jun. 16, 2020.
(Continued)

*Primary Examiner* — Akelaw Teshale

(57) ABSTRACT

In an information processing system, a storage unit stores data related to a voice of a user for each item of user identification information that identifies the user during transmission or reception of a call. An acquisition unit acquires the user identification information on a calling side and data related to the voice of the user on the calling side after a call is started. A determination unit determines whether the data related to the voice of the user on the calling side and the data related to the voice stored by the storage unit in the user identification information acquired by the acquisition unit are based on the voice of the same person during the call.

7 Claims, 8 Drawing Sheets

(58) Field of Classification Search
CPC ......... H04M 2201/41; H04M 1/27453; H04M 3/385; H04M 1/656; H04M 1/663
See application file for complete search history.

(56) References Cited

U.S. PATENT DOCUMENTS

| | | | |
|---|---|---|---|
| 2006/0212718 | A1 | 9/2006 | Senga |
| 2007/0071206 | A1* | 3/2007 | Gainsboro ........ H04M 3/42221 379/168 |
| 2008/0159488 | A1 | 7/2008 | Raja |
| 2013/0183937 | A1* | 7/2013 | Neal ..................... H04W 12/12 455/411 |
| 2017/0208163 | A1* | 7/2017 | Paul ..................... H04M 3/436 |
| 2018/0020072 | A1 | 1/2018 | Masuda et al. |
| 2018/0114225 | A1* | 4/2018 | Wang ..................... G10L 17/22 |
| 2018/0240028 | A1 | 8/2018 | Baracaldo et al. |
| 2018/0338341 | A1* | 11/2018 | Murakami .............. H04W 4/80 |

FOREIGN PATENT DOCUMENTS

| | | |
|---|---|---|
| JP | 2001-268646 A | 9/2001 |
| JP | 2002-176490 A | 6/2002 |
| JP | 2003-066985 A | 3/2003 |
| JP | 2006-259925 A | 9/2006 |
| JP | 2007-201814 A | 8/2007 |
| JP | 2007-266944 A | 10/2007 |
| JP | 2009-049878 A | 3/2009 |
| JP | 2016-152471 A | 8/2016 |
| JP | 2018-170672 A | 11/2018 |

OTHER PUBLICATIONS

Extended European Search Report for EP Application No. 20823291.8, dated Jul. 15, 2022.
JP Office Action for JP Application No. 2021-525950, dated Apr. 25, 2023 with English Translation.

* cited by examiner

| TELEPHONE NUMBER OF CONTRACTOR | CARRIER OF CONTRACTOR | VOICE DATA OF CONTRACTOR |
|---|---|---|
| 090-XXXX-XXXX | XX | XX.XX |
| ... | ... | ... |

| TELEPHONE NUMBER OF SPEAKER | CARRIER OF SPEAKER | VOICE DATA OF SPEAKER |
|---|---|---|
| 090-XXXX-XXXX | XX | XX.XX |

COMMUNICATION TERMINAL, INFORMATION PROCESSING DEVICE, INFORMATION PROCESSING SYSTEM, INFORMATION PROCESSING METHOD, AND PROGRAM

This application is a National Stage Entry of PCT/JP2020/019080 filed on May 13, 2020, which claims priority from Japanese Patent Application 2019-107903 filed on Jun. 10, 2019, the contents of all of which are incorporated herein by reference, in their entirety.

TECHNICAL FIELD

The disclosure relates to a communication terminal, an information processing device, an information processing system, an information processing method, and a program.

BACKGROUND ART

As a technology related to voice authentication, for example, Patent Documents 1 and 2 disclose the following technology.

Patent Document 1 discloses a technology for performing authentication by determining that a user who has produced an utterance for making an outgoing call is a legitimate user when values of the voice parameters match within a predetermined allowance range. With this technology, it is possible to perform a user authentication operation corresponding to a change in sound quality of a voice even if a user has an ill body condition.

Patent Document 2 discloses a system that includes a local area wireless communication device for communicating with a local terminal via a local area wireless communication line, and performs authentication processing using a voice authentication server when voice authentication is required at the local terminal. With this technology, it is possible to provide a mobile computing environment with higher usability.

PRIOR ART DOCUMENTS

Patent Documents

[Patent Document 1]
Japanese Unexamined Patent Application, First Publication No. 2003-066985
[Patent Document 2]
Japanese Unexamined Patent Application, First Publication No. 2001-268646

SUMMARY OF INVENTION

Problems to be Solved by the Invention

Incidentally, in a voice call using a communication terminal, and the like, a crime such as a request for a transfer of money may occur due to an unauthorized use by a third party pretending to be an original owner (a subscription contractor) of a communication terminal. However, the identity verification of a subscription contractor is only performed at the time of making the subscription contract of the communication terminal using a driver's license or a health insurance card, and is generally not performed after that.

Therefore, in a voice call using the communication terminal, it is required to be able to confirm whether a caller making a call is a person assumed by a receiver.

The object of the disclosure is to provide a communication terminal, an information processing device, an information processing system, an information processing method, and a program that solve the problems described above.

Means for Solving the Problems

According to one aspect of the disclosure, an information processing system includes a storage means configured to store data related to a voice of a user in association with user identification information that identifies the user, an acquisition means configured to acquire the user identification information on a calling side and data related to the voice of the user on the calling side after a call is started, and a determination means configured to determine whether the data related to the voice of the user on the calling side acquired by the acquisition means and the data related to the voice stored in the storage means in association with the user identification information acquired by the acquisition means are based on the voice of the same person during the call.

According to another aspect of the disclosure, an information processing method includes storing data related to a voice of a user in association with user identification information that identifies the user, acquiring the user identification information on a calling side and data related to the voice of the user on the calling side after a call is started, and determining whether the data related to the voice of the user on the calling side acquired in the acquiring step and the data related to the voice stored in the storing step in association with the user identification information acquired in the acquiring step are based on the voice of the same person during the call.

According to still another aspect of the disclosure, a program causes a computer to function as a storage means configured to store data related to a voice of a user in association with user identification information that identifies the user, an acquisition means configured to acquire the user identification information on a calling side and data related to the voice of the user on the calling side after a call is started, and a determination means configured to determine whether the data related to the voice of the user on the calling side acquired by the acquisition means and the data related to the voice stored by the storage means in association with the user identification information acquired by the acquisition means are based on the voice of the same person during the call.

According to still another aspect of the disclosure, an information processing device includes an acquisition means configured to acquire user identification information that identifies a user on a calling side and data related to a voice of the user on the calling side after a call is started, a determination means configured to determine whether data related to the voice of the user on the calling side and data related to the voice read from a storage means that stores data related to the voice of the user corresponding to the user identification information acquired by the acquisition means are based on the same person during the call.

According to still another aspect of the disclosure, a communication terminal on a receiving side that receives a call from a calling side, includes an output means that, when a result of determining whether data related to a voice of a user on the calling side and data related to the voice of the user on the calling side stored in advance are based on the voice of the same person is received, outputs the result of the determination during the call.

Advantageous Effects of the Invention

According to at least one of the aspects described above, it is possible to prevent an unauthorized use of a communication terminal.

BRIEF DESCRIPTION OF DRAWINGS

FIG. 5 is a block diagram which shows a configuration of an information processing system according to the embodiment.

EXAMPLE EMBODIMENTS

First Embodiment

Figure 1:
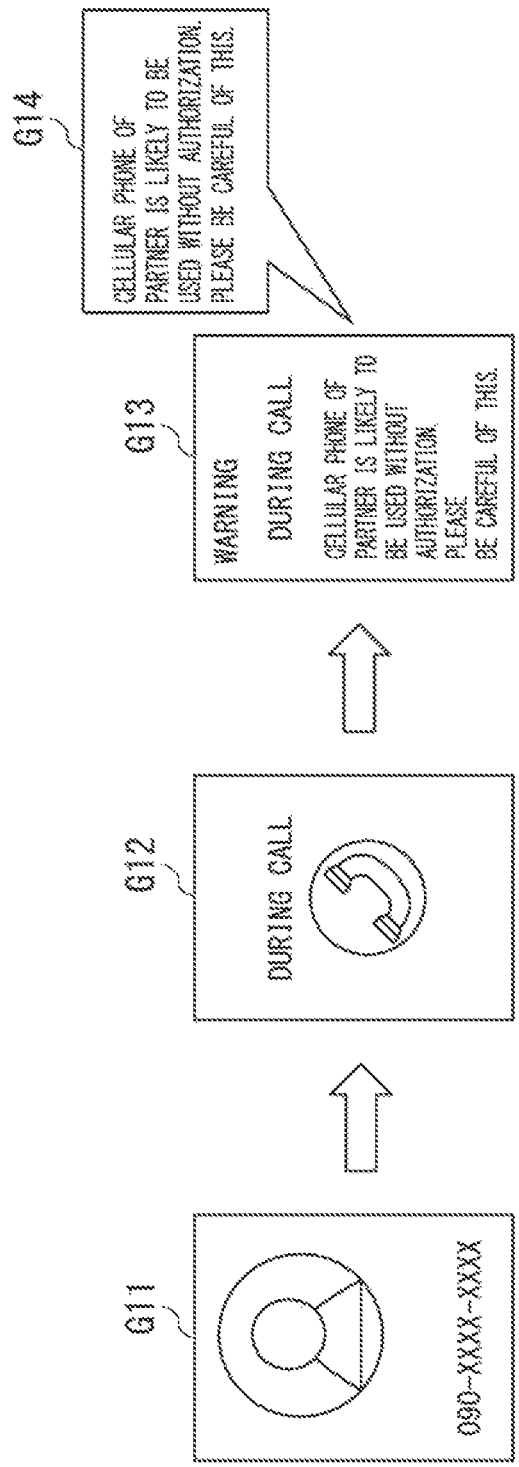
FIG. 1 is a diagram which shows an example of a screen flow according to an embodiment.

Hereinafter, a first embodiment of the disclosure will be described in detail with reference to the drawings.
<<Screen Flow>>
FIG. 1 is a schematic diagram which represents an example of a screen flow of a mobile communication terminal 24A on a called side according to the first embodiment.

Figure 3:
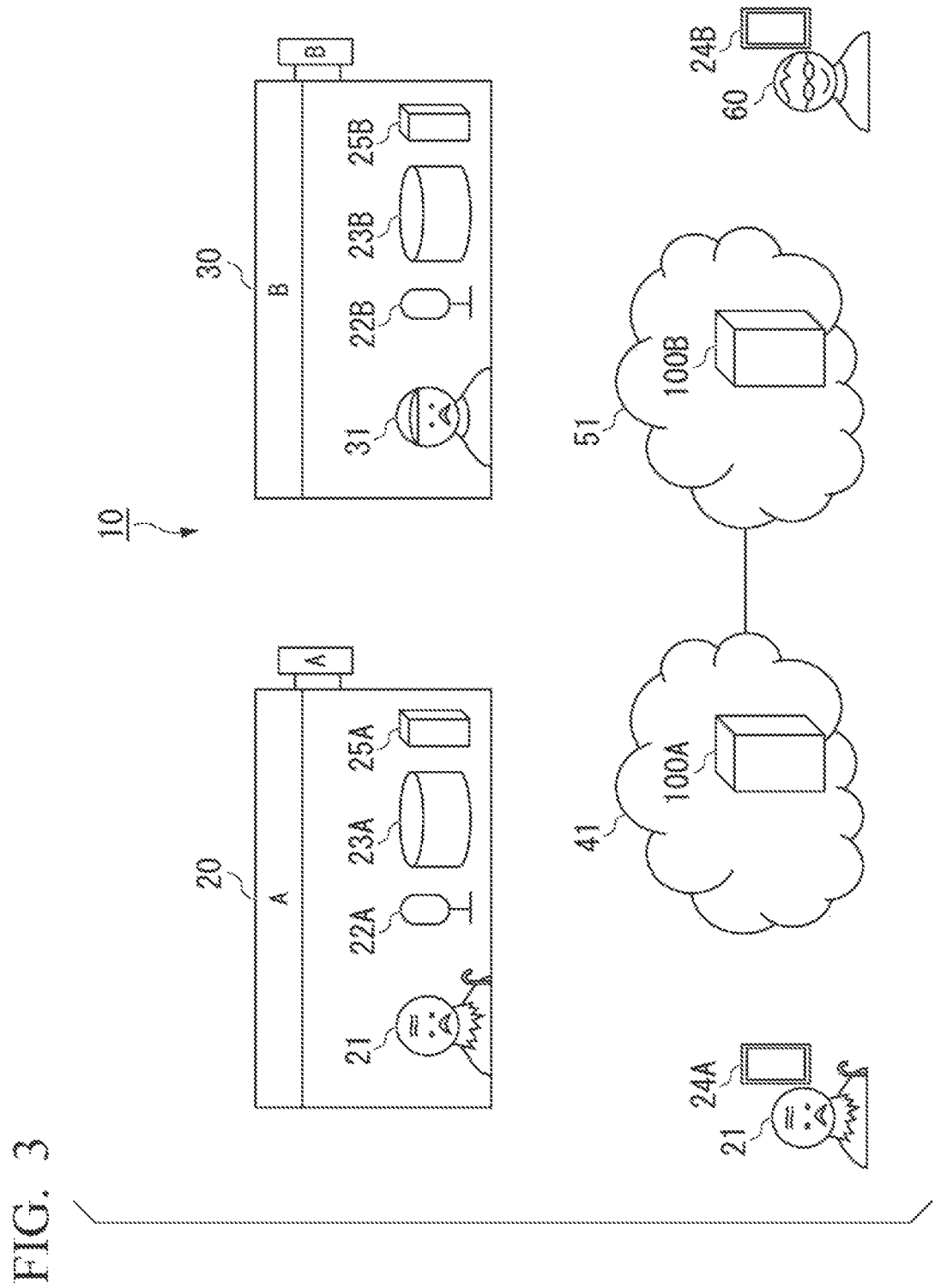
FIG. 3 is a diagram which shows a configuration of an unauthorized use prevention system according to the embodiment.

FIG. 1 shows a screen flow displayed by the mobile communication terminal 24A of a called party (a user 21 in FIG. 3). This screen flow is displayed on a display of the mobile communication terminal 24A by an information processing system 100A provided in the unauthorized use prevention system 10.

When a caller (a user 60 in FIG. 3) makes a telephone call to the mobile communication terminal 24A of the user 21 using a mobile communication terminal 24B on a calling side, a screen G11 is displayed on the mobile communication terminal 24A of the user 21. When the user 21 answers the call, a screen G12 is displayed.

When the information processing system 100A of the unauthorized use prevention system 10 detects an unauthorized use of the user 60, a screen G13 is displayed and a voice message G14 of the unauthorized use is played. The unauthorized use is a use of a mobile communication terminal (also referred to as "spoofing") by a person who is not a contractor (an original owner) who has made a subscription contract for the mobile communication terminal.

In this manner, when spoofing is detected during a call by the information processing system 100A, the mobile communication terminal 24A on a called side displays a result of the detection.

As a result, a receiver can confirm whether a caller is a person assumed by a receiving side (a subscription contractor of the mobile communication terminal 24B on a calling side) even during a call. For this reason, spoofing can be prevented.

Figure 2:
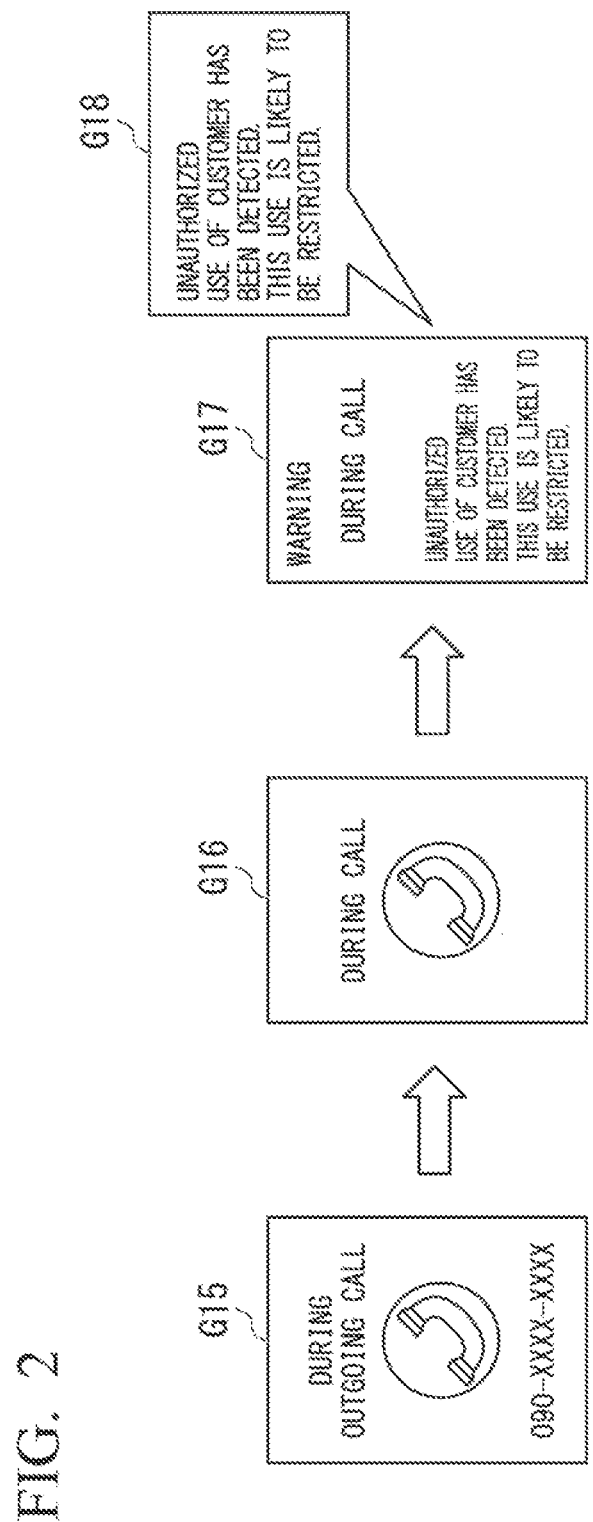
FIG. 2 is a diagram which shows an example of the screen flow according to the embodiment.

FIG. 2 is a schematic view which shows an example of a screen flow of the mobile communication terminal 24B on the calling side according to the first embodiment.

FIG. 2 is a screen flow displayed by the mobile communication terminal 24B of the user 60 in FIG. 3. This screen flow is displayed on a display of the mobile communication terminal 24B by the information processing system 100 provided in the unauthorized use prevention system 10.

When the user 60 in FIG. 3 makes a telephone call to the mobile communication terminal 24A of the user 21 using the mobile communication terminal 24B, a screen G15 is displayed on the mobile communication terminal 24B of the user 60. When the user 21 answers the call, a screen G16 is displayed.

When the information processing system 100 of the unauthorized use prevention system 10 detects an unauthorized use of the user 60, a screen G17 is displayed and a voice message G18 of the unauthorized use is played.
<<Configuration of Unauthorized Use Prevention System>>
FIG. 3 is a diagram which shows a configuration of the unauthorized use prevention system 10 according to the first embodiment. The unauthorized use prevention system 10 includes a microphone 22A provided in an agency 20 of a communication company A, an agency storage device 23A, and an agency processing device 25A. In addition, the unauthorized use prevention system 10 includes a microphone 22B provided in an agency 30 of a communication company B, an agency storage device 23B, and an agency processing device 25B. Moreover, the unauthorized use prevention system 10 includes a mobile communication terminal 24A of the communication company A used by the user 21 and the mobile communication terminal 24B of the communication company B used by the user 60. Furthermore, the unauthorized use prevention system 10 includes a network 41 of the communication company A and an information processing system 100A connected to the network 41, and a network 51 of the communication company B and an information processing system 100B connected to the network 51.

Microphones 22A and 22B are devices that receive human voices.

Agency storage devices 23A and 23B are devices that store user identification information and voiceprints of users who make subscription contracts for mobile communication terminals at the agencies, and include, for examples, hard disks. The user identification information is information that identifies a user at the time of transmitting or receiving a telephone call, and includes, for example, a carrier type and a telephone number with which a user makes a subscription contract, and a unique number of the user. A carrier type is a communication company with which the user has made a subscription contract.

Figure 4:
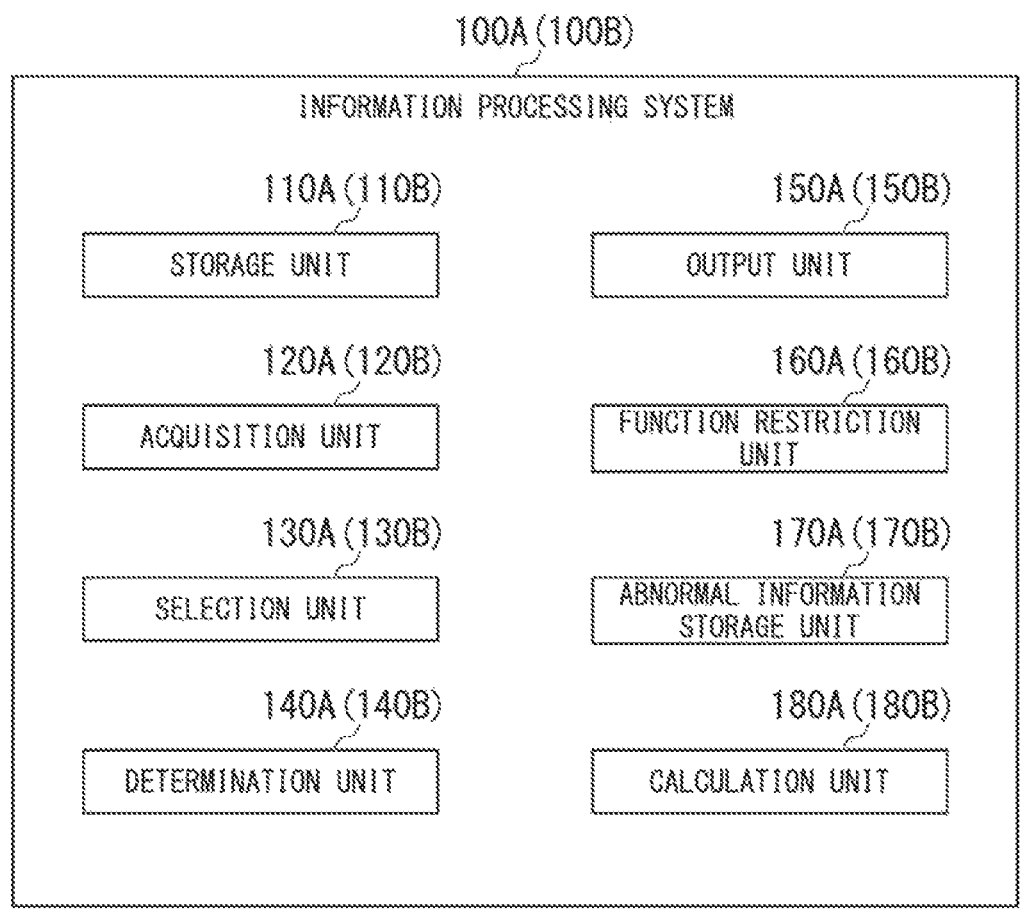
FIG. 4 is a table which shows an example of data stored by an agency storage device of the unauthorized use prevention system according to the embodiment.

FIG. 4 is a table which shows an example of data stored by the agency storage devices 23A and 23B. As shown in FIG. 4, the agency storage devices 23A and 23B store a telephone number contracted by a contractor, a carrier contracted by a contractor, and voice data of each subscription contractor. Voice data is stored in a column of the voice data of a contractor in a third column in FIG. 4.

The mobile communication terminals 24A and 24B are communication terminals whose one side or both sides can move. The mobile communication terminals are examples of a communication terminal. Examples of the mobile communication terminals 24A and 24B include smartphones, tablets, tablets with a telephone function, or Internet of Things (IoT) devices having a telephone function.

The agency processing devices 25A and 25B receive user identification information and voice data from the microphones 22A and 22B, and store them in the agency storage devices 23A and 23B.

The user 21 visits the agency 20 of the communication company A and makes a subscription contract for the mobile communication terminal 24A of the communication company A. At the time of this contract, the agency 20 uses the microphone 22A to collect a voice of the user 21 and receive it as voice (voiceprint) data. After that, the agency 20 sets a carrier type and a telephone number of the mobile communication terminal 24A contracted by the user 21 as user identification information of the user 21 by using the agency processing device 25A. The agency processing device 25A causes the agency storage device 23A to store the voice (voiceprint) data received from the user 21 in association with the user identification information of the user 21.

On the other hand, the user 31 visits the agency 30 of the communication company B and makes a subscription contract for the mobile communication terminal 24B of the communication company B. At the time of this contract, the agency 30 uses the microphone 22B to collect a voice of the user 31 and receive it as voice (voiceprint) data. After that, the agency 30 uses the agency processing device 25B to set a carrier type and a telephone number of the mobile communication terminal 24B contracted by the user 31 as user identification information of the user 31. The agency processing device 25B causes an agency storage device 23B to store the voice (voiceprint) data received from the user 31 in association with the user identification information of the user 31.

<<Configuration of Information Processing System>>

FIG. 5 is a schematic block diagram which shows a configuration of the information processing systems 100A and 100B. The information processing systems 100A and 100B include storage units 110A and 110B, acquisition units 120A and 120B, selection units 130A and 130B, determination units 140A and 140B, output units 150A and 150B, function restriction units 160A and 160B, abnormal information storage units 170A and 170B, and calculation units 180A and 180B, respectively.

The storage units 110A and 110B store voiceprint data (an example of "data related to a voice") of a user for each item of user identification information. For example, the storage unit 110A of the information processing system 100A of a network 41 in FIG. 3 stores user identification information stored by the agency storage device 23A provided in the agency 20, and the voiceprint data for each item of user identification information in association with the user identification information. The storage unit 110B of the information processing system 100B of a network 51 in FIG. 3 stores user identification information stored by the agency storage device 23B provided in the agency 30, and the voiceprint data for each item of user identification information in association with the user identification information.

Voiceprint data is, for example, data that represents a voiceprint and data that represents a feature amount of a voice of a speaker. However, the voiceprint data is not limited to this, and may also be voice data other than a voiceprint, or data that is a combination of a voice and an image.

The acquisition units 120A and 120B acquire user identification information of a communication terminal on a calling side and data related to a voice of a caller after a call is started.

Figures 6, 7:
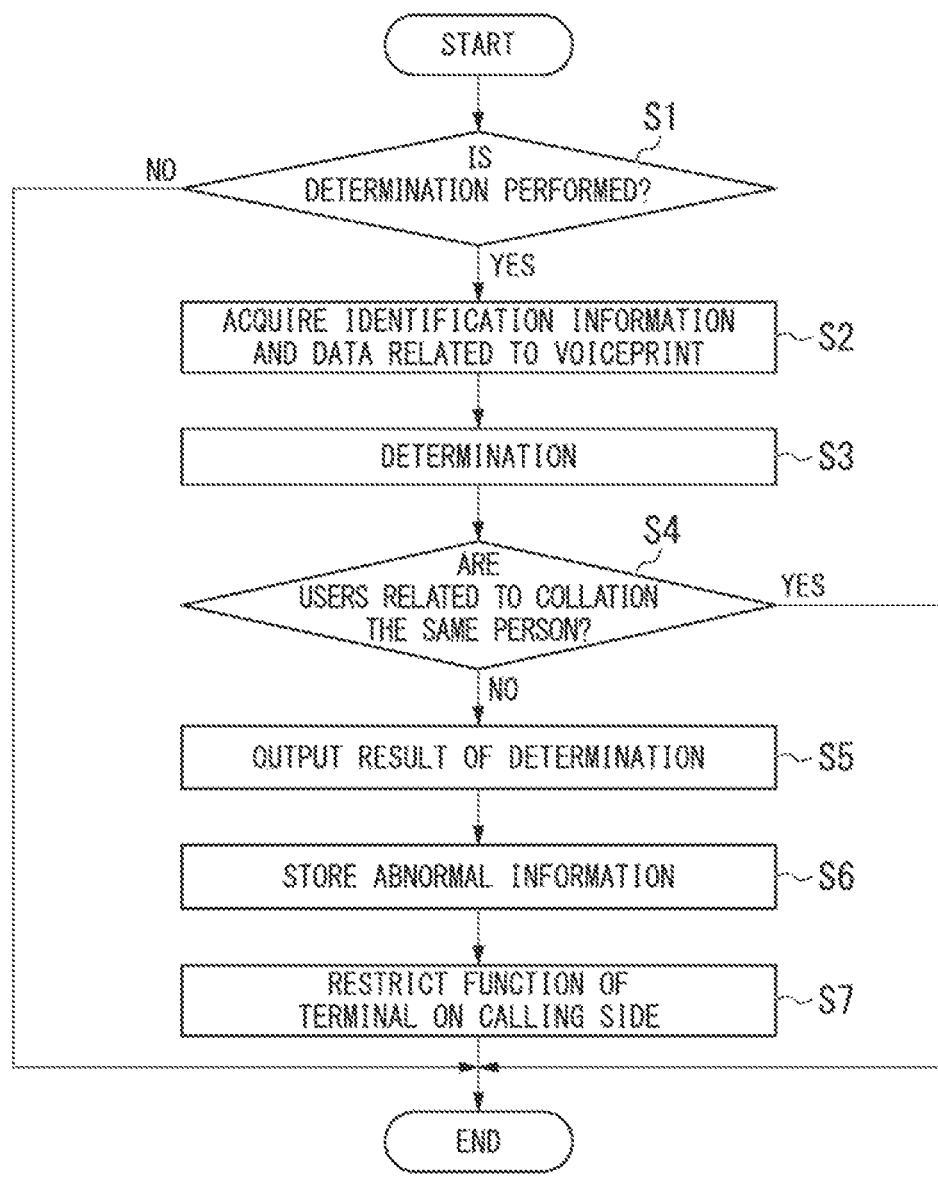
FIG. 6 is a table which shows an example of data acquired by an acquisition unit of the information processing system according to the embodiment.
FIG. 7 is a flowchart which shows an operation of the information processing system according to the embodiment.

FIG. 6 is a diagram which shows an example of data acquired by the acquisition units 120A and 120B.

For example, the acquisition unit 120A of the information processing system 100A of the network 41 in FIG. 3 acquires a carrier type and a telephone number of the mobile communication terminal 24B, which are user identification information of the mobile communication terminal 24B on a calling side, and call voice data (an example of "data related to a voice") of the user 60 after a call between the user 60 and the user 21 is started. Call voice data is data that represents a voice during a call.

In addition, the acquisition unit 120B of the information processing system 100B of the network 51 in FIG. 3 acquires the carrier type and the telephone number of the mobile communication terminal 24B, which are the user identification information of the mobile communication terminal 24B on the calling side, and voiceprint data related to the voice of the user 60 recorded in the storage unit 110B corresponding to the user identification information after the call between the user 60 and the user 21 is started.

The selection unit 130A selects whether the determination unit 140A performs a determination after the call is started. The determination involves determining whether the call voice data of the user 60 on the calling side of the call and the voiceprint data stored by the storage unit 110B in association with the user identification information of the communication terminal 24B on the calling side are based on the voice of the same person.

For example, the selection unit 130A of the information processing system 100A of network 41 and the selection unit 130B of the information processing system 100B of network 51 in FIG. 3 randomly select whether the determination units 140A and 140B perform the determination. When the selection units 130A and 130B select to perform the determination, the determination units 140A and 140B perform the determination. On the other hand, when the selection units 130A and 130B select not to perform the determination, the determination units 140A and 140B do not perform the determination.

When the selection units 130A and 130B select to perform the determination, the determination units 140A and 140B determine whether the call voice data of the user on the calling side of the call and the voiceprint data stored by the storage unit 110 in association with the user identification information related to the calling side of the call in the user identification information acquired by the acquisition units 120A and 120B during the call are based on the voice of the same person.

For example, in the example of FIG. 3, when the selection unit 130A selects to perform the determination, the determination unit 140A uses the voice data of the user 60 acquired by the acquisition unit 120A as a collation target. In addition, the determination unit 140A uses the voice (voiceprint) data of the user 31 stored by the storage unit 110B in association with the user identification information of the mobile communication terminal 24B acquired by the acquisition unit 120B as another collation target.

That is, in this collation, the call voice data of the user 60 and the voiceprint data of the user 31 are collated. A known voice collation method is used for this collation.

After the collation described above, for example, in the example shown in FIG. 3, the determination unit 140A compares the voiceprint of the user 31 with the voiceprint extracted from the call voice data of the user 60. As a result, the determination unit 140A determines whether the voiceprint data of the user 31 and the call voice data of the user 60 are based on the voice of the same person. In the example shown in FIG. 3, since the voiceprint of the user 31 and the voiceprint extracted from the call voice data of the user 60 do not match, the determination unit 140A determines that the user 31 and the user 60 are not the same person. That is, the determination unit 140A determines that the user 60 is using the communication terminal 24B without authorization.

The determination unit 140A of the information processing system 100A does not perform the determination described above when the selection unit 130A selects not to perform the determination.

On the other hand, the determination unit 140B of the information processing system 100B of the network 51 acquires the carrier type and the telephone number related to the mobile communication terminal 24B acquired by the acquisition unit 120B, and the call voice data of the user 60.

After that, the determination unit 140B collates the call voice data of the user 60 with voiceprint data corresponding to the user identification information (the carrier type and the telephone number) of the mobile communication terminal 24B stored by the storage unit 110B. As a result of this collation, in the example of FIG. 3, the determination unit 140B determines whether the user 31 and the user 60 are the same person.

On the other hand, the determination unit 140B of the information processing system 100B does not perform the determination described above when the selection unit 130B selects not to perform the determination.

The output units 150A and 150B output results of the determination by the determination units 140A and 140B, respectively. For example, since it is determined by the determination units 140A and 140B that the user 31 and the user 60 are not the same person, the output unit 150A of the information processing system 100A of the network 41 and the output unit 150B of the information processing system 100B of the network 51 output a result of the determination.

Here, the output unit 150A notifies the mobile communication terminal 24A on a receiving side of the result of the determination, and outputs the result to an output unit of the mobile communication terminal 24A on the receiving side. The output unit of the mobile communication terminal 24A is, for example, a display, a vibrator that generates vibration, and a speaker that generates a voice. The output units 150A and 150B may output a result of the determination for each carrier type, and in this case, may also transmit the result of the determination to a communication company for each carrier type.

When the results of the determination by the determination units 140A and 140B are that the call voice data of the user on the calling side and the voiceprint data stored by the storage unit 110A or 110B are not based on the voice of the same person, the function restriction units 160A and 160B restrict functions of devices on the calling side.

Examples of these devices include mobile communication terminals and fixed line telephones, which are communication terminals on the calling side related to determination. Examples of the restricted functions include an incoming call function and an outgoing call function. Examples of a function restriction timing include immediately after the determination described above and immediately after an end of the call according to the determination described above.

For example, in the example shown in FIG. 3, in the function restriction unit 160B of the information processing system 100B, the determination unit 140B determines that the user 31 who is a subscription contractor of the mobile communication terminal 24B and the user 60 are not the same person. For this reason, the function restriction unit 160B restricts the outgoing call function of the mobile communication terminal 24B immediately after the call according to this determination.

When each result of the determination by the determination units 140A and 140B is that the call voice data of the user on the calling side and the voiceprint data stored by the storage unit 110A or 110B are not based on the voice of the same person, the abnormal information storage units 170A and 170B store the call voice data on the calling side.

For example, in the example shown in FIG. 3, the abnormal information storage unit 170B of the information processing system 100B stores the call voice data of the user 60 on the calling side immediately after the determination unit 140B determines that the user 31 and the user 60 are not the same person.

The calculation units 180A and 180B calculate the amount of money to be charged to a user according to the number of determinations by the determination units 140A and 140B in a certain period of time, respectively.

For example, in the example shown in FIG. 3, the determination unit 140A of the information processing system 100A performs ten determinations on the mobile communication terminal 24A of the user 21 in a certain period of time, and calculates 100 yen as the amount of money to be charged to the user 21 when the amount of money to be charged for each determination is 10 yen.

The amount of money to be charged by the calculation units 180A and 180B may be calculated according to the result of the determination as well as the number of determinations. For example, when there are ten determinations in a certain period of time and the determination units 140A and 140B perform determination once out of the ten times that there is an unauthorized use, the amount of money to be charged for each determination can be set to 10 yen and the amount of money to be charged for each determination of an unauthorized use can be set to 1000 Yen. In this case, the calculation unit 180 calculates 1100 yen as the amount of money to be charged to a user.

The calculation units 180A and 180B may calculate the amount of money to be charged to communication companies or groups for each carrier type of communication company or for each group made of a plurality of communication companies. In this case, the calculation units 180A and 180B add up the amount of money for each carrier type or for each carrier type of a plurality of communication companies belonging to a group or the like.

In the example shown in FIG. 3, the user 60 is making a call to the user 21 by using the mobile communication terminal 24B with which the user 31 has made a subscription contract without authorization.

Since the mobile communication terminal 24B that is used by the user 60 without authorization is a communication terminal of the communication company B, the network 51 of the communication company B is used to be linked with the network 41 of the communication company A. That is, the mobile communication terminal 24B that is used by the user 60 without authorization is linked with the mobile communication terminal 24A of the user 21 through the network 41.

<<Operation of Information Processing System>>

In the following description, operations of the information processing systems 100A and 110B will be described with reference to FIG. 7.

FIG. 7 is a flowchart which shows the operations of the information processing systems 100A and 110B according to the first embodiment. The information processing systems 100A and 110B perform the operations shown in FIG. 7 for each call.

In step S1, the selection units 130A and 130B randomly select, for example, whether the determination units 140A and 140B perform a determination after a call is started.

When the selection units 130A and 130B select not to perform a determination (NO in step S1), the operations of the information processing systems 100A and 100B in the call end.

On the other hand, when the selection units 130A and 130B select to perform a determination (YES in step S1), the acquisition units 120A and 120B acquire the user identification information and the call voice data on the calling side (step S2).

The determination units 140A and 140B collate the calling voice data on the calling side with the voiceprint data stored by the storage units 110A and 110B on the basis of the data acquired by the acquisition units 120A and 120B in step S2 (step S3).

In step S3, when a result of the determination by the determination units 140A and 140B is that the users related to the collation in step S3 are the same person (YES in step S4), the operations of the information processing systems 100A and 100B in the call end.

On the other hand, when a result of the determination by the determination units 140A and 140B in step S3 is that the users related to the collation in step S3 are not the same person (NO in step S4), the output units 150A and 150B output the result of the determination in step S3 (step S5).

The abnormal information storage units 170A and 170B store the call voice data on the calling side (step S6).

The function restriction units 160A and 160B restrict functions of devices on the calling side (step S7).

Figure 8:
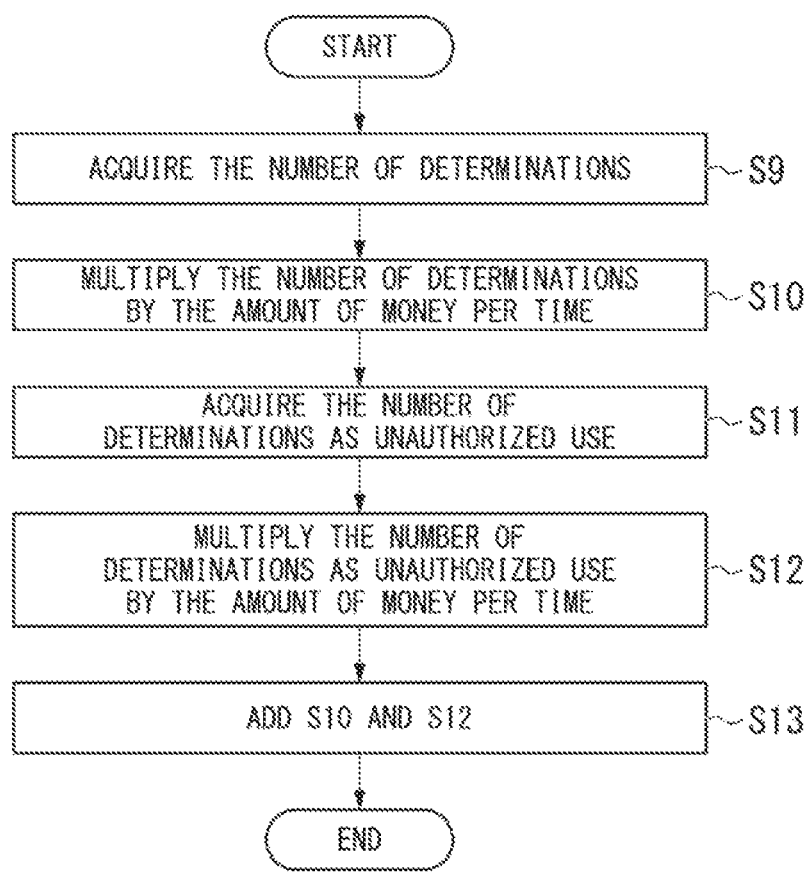
FIG. 8 is a flowchart which shows an operation of a calculation unit of the information processing system according to the embodiment.

FIG. 8 is a flowchart which shows operations of the calculation units 180A and 180B of the information processing systems 100A and 100B according to the first embodiment. The calculation units 180A and 180B perform the operation according to FIG. 8 for each period set in advance.

In step S9, the calculation units 180A and 180B acquire the number of determinations by the determination units 140A and 140B during the period set in advance.

The calculation units 180A and 180B multiply the number of determinations acquired in step S9 by the amount of money per time (step S10).

In step S11, the calculation units 180A and 180B acquire the number of determinations as an unauthorized use by the determination units 140A and 140B during the period set in advance.

The calculation units 180A and 180B multiply the number of determinations acquired in step S11 by the amount of money per time (step S12).

The calculation units 180A and 180B add step S10 and step S12 to calculate the amount of money (step S13).

<<Advantageous Effect>>

As described above, according to the first embodiment, the information processing systems 100A and 100B include the storage units 110A and 110B that store the voiceprint data for each item of user identification information, and the acquisition units 120A and 120B that acquire the user identification information on the calling side and the call voice data of the user on the calling side after a call is started. In addition, the information processing systems 100A and 100B include the determination units 140A and 140B that determine whether the call voice data of the user on the calling side and the voiceprint data stored by the storage unit 110A or 110B are based on the voice of the same person for the user identification information acquired by the acquisition units 120A and 120B during the call. As a result, the information processing systems 100A and 100B can allow a business operator to easily detect an unauthorized use.

According to the first embodiment, the information processing systems 100A and 100B include the selection units 130A and 130B that randomly select, for example, whether the determination units 140A and 140B perform a determination after a call is started. Moreover, the determination units 140A and 140B of the information processing systems 100A and 100B perform a determination when the selection units 130A and 130B select that they perform a determination. As a result, the information processing systems 100A and 100B can reduce a burden on the system due to a determination performed every time while suppressing an unauthorized use by a determination.

According to the first embodiment, the information processing systems 100A and 100B include the output units 150A and 150B that output results of the determination by the determination units 140A and 140B. As a result, the information processing systems 100A and 100B can provide a user with information on an unauthorized use of a communication terminal, and reduce a damage caused by the unauthorized use by suppressing the unauthorized use.

According to the first embodiment, the information processing systems 100A and 100B include the function restriction units 160A and 160B that restrict the functions of the devices on the calling side when the results of the determination by the determination units 140A and 140B are that the voiceprint data of the user on the calling side and the voiceprint data stored by the storage unit 110A or 110B are not based on the voice of the same person. As a result, the information processing systems 100A and 100B can restrict a use of a communication terminal according to an unauthorized use, and can prevent the unauthorized use after the restriction.

According to the first embodiment, the information processing systems 100A and 100B include the abnormal information storage units 170A and 170B that store the call voice data on the calling side when the results of the determination by the determination units 140A and 140B are that the call voice data of the user on the calling side and the voiceprint data stored by the storage unit 110A or 110B are not based on the voice of the same person. As a result, the information processing systems 100A and 100B can store abnormal information due to the unauthorized use of a communication terminal, and can suppress the unauthorized use by providing an evidence of the unauthorized use to national institutions, and the like.

Second Embodiment

<<Configuration of Information Processing System>>

In the following description, an information processing system 100C according to a second embodiment will be described with reference to the drawings.

Figure 9:
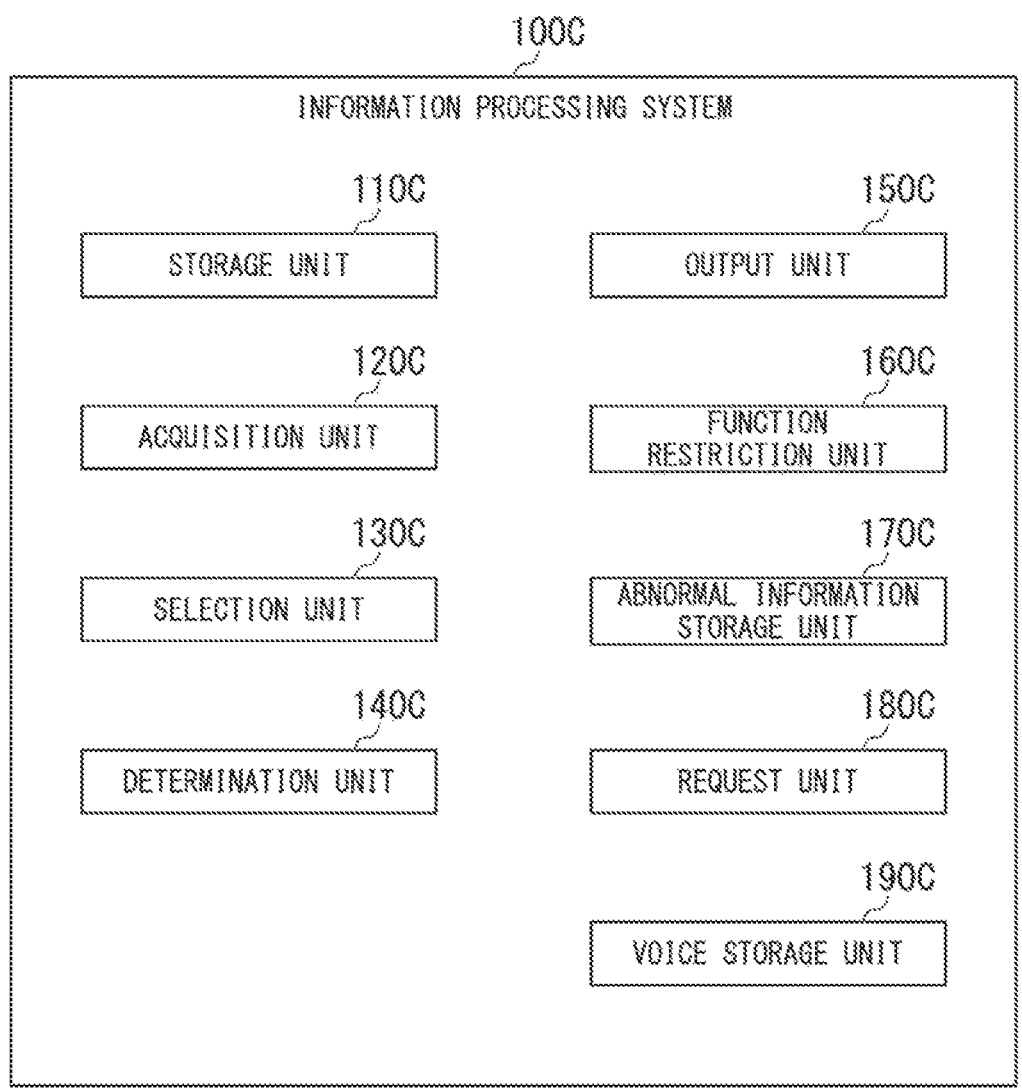
FIG. 9 is a block diagram which shows a configuration of the information processing system according to the embodiment.

FIG. 9 is a schematic block diagram which shows a configuration of the information processing system 100C according to the second embodiment. The configuration of the information processing system 100C according to the second embodiment is a configuration in which a voice storage unit 190C is added to the configurations of the information processing systems 100A and 100B according to the first embodiment. Since the information processing system 100C according to the second embodiment includes the voice storage unit 190C, an unauthorized use can be prevented by the determination unit 140C performing a determination on a communication terminal, which is more likely to be used without authorization.

The voice storage unit 190C stores the call voice data on the calling side. For example, the voice storage unit 190C stores not only the call voice data in a call between the user 21 and the user 60 in FIG. 3, but also the call voice data on the calling side in all the calls via the network 41 in a certain period of time.

A selection unit 130C selects whether the determination unit 140C performs a determination after a call is started on the basis of the call voice data stored by the voice storage unit 190C and data set in advance.

For example, the voice storage unit 190C stores the call voice data on the calling side in all the calls via the network 41 in a certain period of time.

The selection unit 130C analyzes a voice of the call voice data stored by the voice storage unit 190C and generates a sentence representing the voice. When a keyword of "transfer" is set in advance, the selection unit 130C extracts call voice data in which the keyword appears from the generated sentence. The voice storage unit 190C selects a mobile communication terminal of user identification information corresponding to the extracted call voice data. Here, the voice storage unit 190C may select a mobile communication terminal having a large number of selected call voice data.

<<Advantageous Effect>>

As described above, according to the second embodiment, the information processing system 100C includes the voice storage unit 190C that stores the call voice data of the user on the calling side, and includes a selection unit 130C that selects whether the determination unit 140C performs a determination after a call is started on the basis of the call voice data stored by the voice storage unit 190C and the data set in advance. As a result, the information processing system 100C can prevent an unauthorized use by the determination unit 140C performing a determination on a communication terminal, which is more likely to be used without authorization.

Other Embodiment

Although one embodiment has been described in detail with reference to the drawings, a specific configuration is not limited to the description above, and various design changes and the like can be made.

For example, in the example of the embodiment described above, the configuration is configured by the mobile communication terminals 24A and 24B, but may also be configured by a fixed telephone having a telephone function and an IoT device instead of the mobile communication terminals. In addition, the selection units 130A to 130C may select that the determination units 140A to 140C perform a determination when a call is made from a telephone number set by a user.

<<Basic Configuration>>

Figure 10:
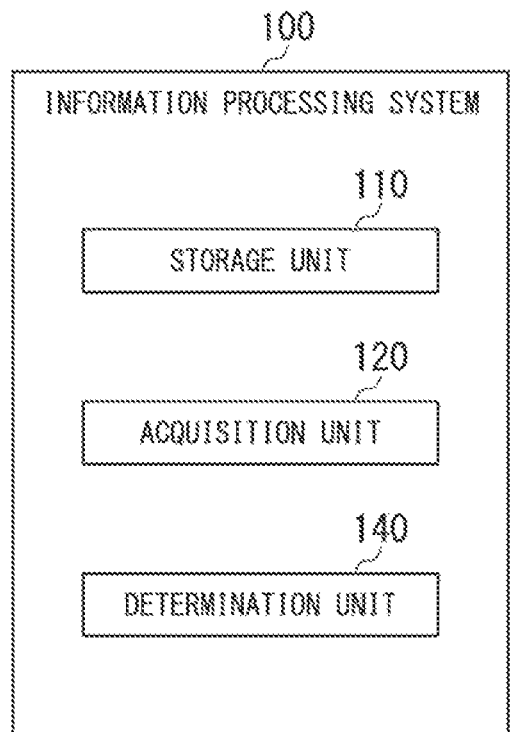
FIG. 10 is a block diagram which shows a basic configuration of the disclosure.

FIG. 10 is a schematic block diagram which shows a basic configuration of the information processing system 100 of the disclosure.

The information processing system 100 related to the basic configuration includes a storage unit 110, an acquisition unit 120, and a determination unit 140.

The information processing system 100 according to a basic configuration includes the storage unit 110 that stores data related to a voice for each item of user identification information, and the acquisition unit 120 that acquires the user identification information on the calling side and data related to a voice of the user on the calling side after a call is started. Moreover, the information processing system 100 includes the determination unit 140 that determines whether the data related to the voice of the user on the calling side and the data related to a voice stored in the storage unit 110 are based on the voice of the same person for the user identification information acquired by the acquisition unit 120 during the call. As a result, the information processing system 100 can allow a business operator to easily detect an unauthorized use.

Figure 11:
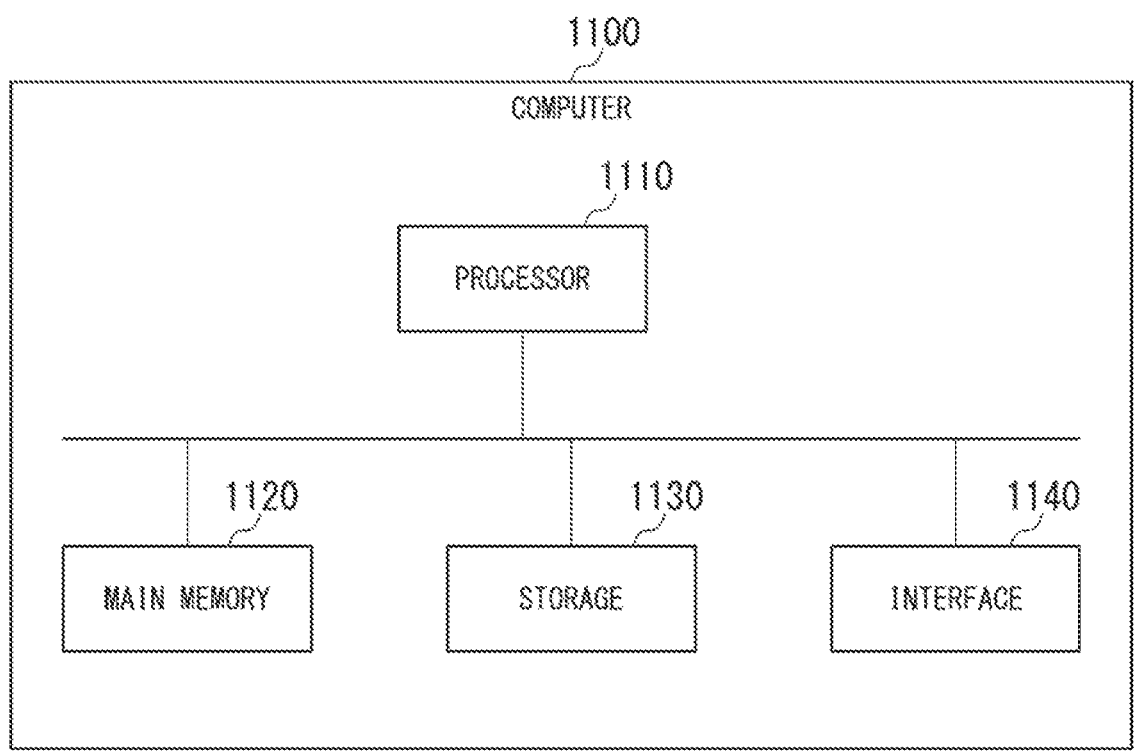
FIG. 11 is a block diagram which shows a configuration of a computer according to at least one embodiment.

FIG. 11 is a schematic block diagram which shows a configuration of a computer according to at least one embodiment.

A computer 1100 includes a processor 1110, a main memory 1120, a storage 1130, and an interface 1140.

The information processing system 100 described above, an agency storage device 23, and an agency processing device 25 are implemented in a computer 1100. Then, an operation of each processing unit described above is stored in the storage 1130 in a form of a program. The processor 1110 reads a program from the storage 1130, expands it into a main memory 1120, and executes the processing described above according to the program. In addition, the processor 1110 secures a storage area corresponding to each of the storage units described above in the main memory 1120 according to the program.

The program may be a program for realizing a part of functions to be exerted by the computer 1100. For example, the program may exert the functions in combination with another program already stored in the storage 1130, or in combination with another program implemented in another device. In another embodiment, the computer 1100 may include a custom large scale integrated circuit (LSI) such as a programmable logic device (PLD) in addition to or in place of the configuration described above. Examples of the PLD include a programmable array logic (PAD), a generic array logic (GAL), a complex programmable logic device (CPLD), and a field programmable gate array (FPGA). In this case, some or all of the functions realized by the processor 1110 may be realized by a corresponding integrated circuit.

Examples of the storage 1130 include magnetic disks, magneto-optical discs, semiconductor memories, and the like. The storage 1130 may be an internal media directly connected to a bus of the computer 1100, or may also be an external media connected to the computer via the interface 1140 or a communication line. Moreover, when this program is distributed to the computer 1100 by the communication line, the computer 1100 that has received the distribution may expand the program to the main memory 1120 and execute the processing described above. In at least one embodiment, the storage 1130 is a non-temporary tangible storage medium.

In addition, the program may be a program for realizing a part of the functions described above. Furthermore, the program may be a so-called difference file (a difference program) that realizes the functions described above in combination with another program already stored in the storage 1130.

Priority is claimed on Japanese Patent Application No. 2019-107903, filed Jun. 10, 2019, the content of which is incorporated herein by reference.

REFERENCE SYMBOLS LIST

10 Unauthorized use prevention system
20 Agency
21 User
22 22A, 22B Microphone
23 23A, 23B Agency storage device
24-24A 24B Mobile communication terminal
25 25A, 25B Agency processing device
30 Agency
31 User
41 Network
51 Network
60 User
100, 100A, 100B, 100C Information processing system
110, 110A, 110B, 110C Storage unit
120, 120A, 120B, 120C Acquisition unit
130A, 130B, 130C Selection unit
140, 140A, 140B, 140C Determination unit
150A, 150B, 150C Output unit
160A, 160B, 160C Function restriction unit
170A, 170B, 170C Abnormal information storage unit
180A, 180B, 180C Calculation unit
190C Voice storage unit
1100 Computer
1110 Processor
1120 Main memory
1130 Storage
1140 Interface

The invention claimed is:

1. An information processing system comprising:
a memory storing instructions; and
one or more processors connected to the memory and configured to execute the instructions to:
store data related to a voice of a user in association with user identification information that identifies the user;
acquire the user identification information on a calling side and data related to the voice of the user on the calling side after a call is started;
determine whether the data related to the voice of the user on the calling side and the data related to the voice stored in association with the user identification information are based on the voice of a same person during the call; and
play a voice message pertaining to an unauthorized use on a communication terminal on a called side which receives the voice of the user on the calling side upon determining that the data related to the voice of the user on the calling side and the data related to the voice are not based on the voice of the same person.

2. The information processing system according to claim 1, wherein the one or more processors are configured to further execute the instructions to:

randomly select whether to perform determination as to whether the data related to the voice of the user on the calling side and the data related to the voice stored in association with the user identification information are based on the voice of the same person during the call; and
perform the determination upon randomly selecting to perform the determination.

3. The information processing system according to claim 1, wherein the one or more processors are configured to further execute the instructions to:
store the data related to the voice of the user on the calling side; and
select whether or not to perform the determination based on the data related to the voice stored in association with the user identification information and data set in advance after the call is started.

4. The information processing system according to claim 1, wherein the one or more processors are configured to further execute the instructions to restrict a communication function of a communication terminal on the calling side upon determining that the data related to the voice of the user on the calling side and the data related to the voice stored in association with the user identification information are not based on the voice of the same person.

5. The information processing system according to claim 1, wherein the one or more processors are configured to further execute the instructions to store the data related to the voice of the user on the calling side when upon determining that the data related to the voice of the user on the calling side and the data related to the voice stored in association with the user identification information are not based on the voice of the same person.

6. An information processing method comprising:
storing, by a processor, data related to a voice of a user in association with user identification information that identifies the user;
acquiring, by the processor, the user identification information on a calling side and data related to the voice of the user on the calling side after a call is started;
determining, by the processor, whether the data related to the voice of the user on the calling side and the data related to the voice stored in association with the user identification information are based on the voice of a same person during the call; and
playing a voice message pertaining to an unauthorized use on a communication terminal on a called side which receives the voice of the user on the calling side upon determining that the data related to the voice of the user on the calling side and the data related to the voice are not based on the voice of the same person.

7. A non-transitory computer readable medium storing a program which when executed by a computer causes the computer to perform:
storing data related to a voice of a user in association with user identification information that identifies the user;
acquiring the user identification information on a calling side and data related to the voice of the user on the calling side after a call is started;
determining whether the data related to the voice of the user on the calling side and the data related to the voice stored in association with the user identification information are based on the voice of a same person during the call; and
playing a voice message pertaining to an unauthorized use on a communication terminal on a called side which receives the voice of the user on the calling side upon determining that the data related to the voice of the user on the calling side and the data related to the voice are not based on the voice of the same person.

* * * * *